United States Patent

Fowler

[11] 3,975,621
[45] Aug. 17, 1976

[54] DIGITAL COMPASS AVERAGING CIRCUIT
[75] Inventor: John T. Fowler, Winthrop, Mass.
[73] Assignee: The Laitram Corporation, New Orleans, La.
[22] Filed: Feb. 24, 1975
[21] Appl. No.: 552,049

[52] U.S. Cl. .......................... 235/150.26; 235/151.3
[51] Int. Cl.² ........................................ G06F 15/50
[58] Field of Search ................ 235/150.51, 150.26, 235/183, 151.32, 92 NT, 92 PB, 92 TF, 92 FQ, 151.3; 324/166 D, 99 D; 340/347 P; 33/355, 363

[56] References Cited
UNITED STATES PATENTS

| | | | |
|---|---|---|---|
| 3,634,946 | 1/1972 | Star | 235/150.26 |
| 3,746,843 | 7/1973 | Wesner | 235/150.26 |
| 3,833,901 | 9/1974 | Fowler | 340/347 P |
| 3,881,094 | 4/1975 | Taylor et al. | 235/183 |

*Primary Examiner*—Jerry Smith
*Attorney, Agent, or Firm*—Weingarten, Maxham & Schurgin

[57] ABSTRACT

For use with a remote reading magnetic compass a digital circuit for computing an output indication of compass heading to provide an output heading indication corrected for changes between successive compass readings. Compass heading is corrected in accordance with a weighted average value of the difference between successively read headings to provide an output which is representative of a true or weighted average heading and an output of the magnitude and sense of such difference.

11 Claims, 2 Drawing Figures

DIGITAL COMPASS AVERAGING CIRCUIT

FIELD OF THE INVENTION

This invention relates to magnetic compasses and more particularly to digital signal processing circuitry for remote reading compasses.

BACKGROUND OF THE INVENTION

Remote reading magnetic compasses are known wherein an electrical signal representation of compass heading is provided and which can be conveyed to one or more remote points for display of compass headings or for other purposes such as in an automatic piloting system. A particularly effective remote reading compass is shown in copending patent application, Ser. No. 279,723 filed Aug. 10, 1972 now U.S. Pat. No. 3,888,016 entitled DIGITAL COMPASS, assigned to the same assignee as this invention. In the compass of this copending application, a compass card is provided in the form of a disc having a plurality of optically coded tracks which are photoelectrically sensed to provide an electrical signal representation of compass headings and which signal is electronically processed to provide a digital pulse train adapted for serial transmission to a remote display or other utilization apparatus.

It is usually desirable in a magnetic compass to provide appropriate damping of the compass card thereby to minimize spurious motion of the card such as caused by rolling, pitching and yawing motions of a vessel aboard which the compass is installed or by other spurious forces, which could give rise to inaccurate compass readings. Such damping is usually accomplished mechanically by immersing the compass structure in a damping liquid having the required viscous properties to minimize spurious card motion. However, such damping necessarily reduces the sensitivity of the compass to changes of heading and it is, of course, desirable to maintain as accurate and sensitive a compass structure as possible while still maintaining sufficient damping to provide a commercially realistic instrument.

SUMMARY OF THE INVENTION

According to the invention a digital averaging circuit is provided for use with a remote reading magnetic compass wherein an output signal representative of compass heading is corrected in accordance with the average value of the error between successive readings of the compass. The invention thus provides a compass output representative of computed compass heading along a selected course and which can be displayed or otherwise employed. A digital signal representative of compass heading sensed by a remote reading compass is compared with the digital signal representation of a prior computed compass reading to provide differential error signals representing both the magnitude and direction of error between successive compass readings. The error value can be divided by a selectable weighting factor to produce a computed output reading representing true or weighted average compass heading. The computed output reading is updated on a continuous on-line basis upon successive receipt of new compass readings from the remote reading compass to provide a continuously computed compass heading in accordance with selected averaging characteristics.

The computed compass heading can be displayed for use such as on a multi-digit numerical display, or can be applied to other utilization apparatus such as an automatic piloting system. The error signal can also itself be utilized in an automatic piloting system or other utilization apparatus where a representation of the error between successive compass readings is useful.

It will be appreciated that the invention is useful to determine the magnitude and sense of the difference between two angular positions derived from other than a remote reading magnetic compass. The invention is broadly useful with a variety of instrumentalities in which angular position of a shaft or other member is sensed. For example, the invention finds particular use with a wind direction indicator to provide an output signal representative of the magnitude and sense of the difference between successive wind direction indications and also representative of average wind direction.

DESCRIPTION OF THE DRAWING

The invention will be more fully understood from the following detailed description taken in conjunction with the accompanying drawings in which.

DETAILED DESCRIPTION OF THE INVENTION

In the illustrated embodiment, a received pulse train is provided by a digital compass transducer as a series of pulses of a number one more than the measured compass heading. Thus, a compass heading, for example, of 46° would be represented by a serial pulse train of 47 pulses. The initial pulse of the pulse train is employed to reset the display circuitry for subsequent processing of the remaining pulses of the received train.

Figure 1:
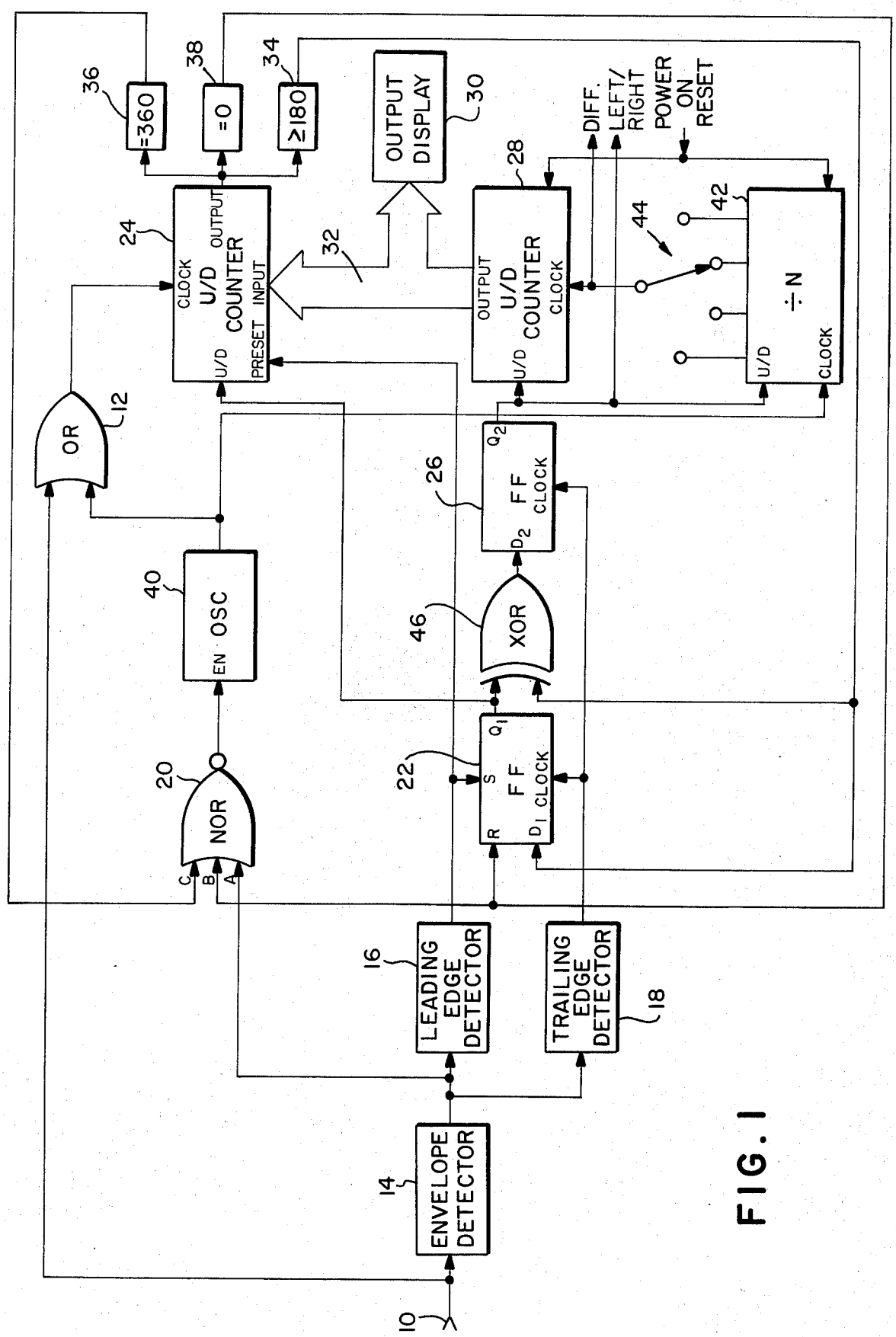
FIG. 1 is a diagrammatic representation of an embodiment of the invention.

A preferred embodiment of the invention is illustrated in FIG. 1. A digital signal from a digital compass transducer or transmitter, such as that shown in the aforesaid patent application is provided as a train of pulses of a number one more than the measured compass reading to an input terminal 10 and thence to one terminal of an OR gate 12 and to the input of an envelope detector 14. The output of the envelope detector 14 is applied respectively to a leading edge detector 16, to a trailing edge detector 18 and to a first input (A) of a three input NOR gate 20. The output of the leading edge detector 16 is connected to the set (S) terminal of a first D-type flip-flop 22 and to the preset terminal of a bidirectional, or up-down, control counter 24. The output of the trailing edge detector 18 is applied to the clock (C) terminal of flip-flop 22 and to the clock terminal of a second D-type flip-flop 26. The data pulse train at input 10 is applied through OR gate 12 to the clock terminal of counter 24.

The control counter 24 is presettable to a value with which the input value is to be compared. For example in the illustrated embodiment, counter 24 cooperates with a bidirectional modulo-360 ring counter 28, in which is stored the value of the previous compass heading. This previously stored value is transferred to counter 24 via a bus 32 by application of an appropriate signal from detector 16 to the preset terminal of counter 24. Additionally, the stored value is available from counter 28 on bus 32 for appropriate output display or other use.

A detector 34 is operative to detect values in the control counter 24 greater than or equal to 180°. A detector 36 is operative to detect the occurrence of a value of 360 degrees in the control counter 24 while a detector 38 is operative to detect the occurrence of zero in counter 24. The zero detector 38 is connected to the reset (R) terminal of flip-flop 22 and to the second input terminal (B) of NOR gate 20. The 360 detector 36 is connected to the third input terminal (C) of NOR gate 20. The output of NOR gate 20 is applied to the enable input of an oscillator 40, the output of which is applied to a second input of the OR gate 12 and also to the clock input of a bidirectional divide-by-N or averaging counter 42. A switch 44 associated with the averaging counter 42 is provided for selecting the value of N by which counter 42 divides and for providing a clock input to the display counter 28. The output of the 180 detector 34 is connected to a first input of a two input EXCLUSIVE OR (XOR) gate 46 and also to the data input $D_1$ of flip-flop 22. The output $Q_1$ of flip-flop 22 is applied to the second input of the XOR gate 46 and also to the up-down control input of control counter 24. The output of the XOR gate 46 is connected to the data input $D_2$ of flip-flop 26, the output of which $Q_2$ is connected to the up-down control input of counter 28.

Figure 2:
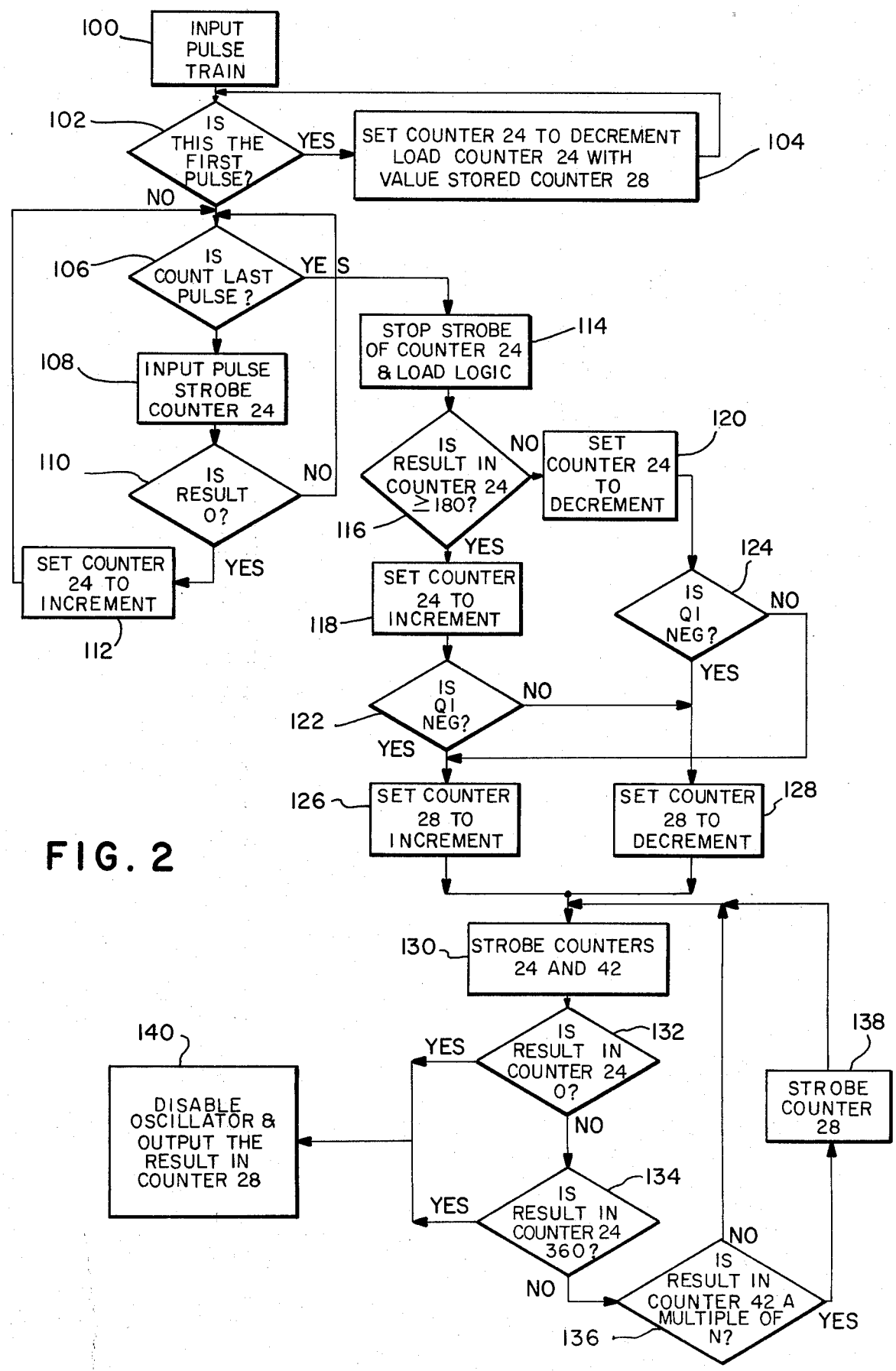
FIG. 2 is a flow chart useful in explaining operation of the invention.

To better understand the operation of the illustrated embodiment of the invention, a flow chart of the logical operation of the circuit is given in FIG. 2. Logical steps for operations and decisions are numbered with numerals beginning with 100; other numerals refer to the elements shown in FIG. 1.

Initially a pulse train is provided 100 at the input terminal 10. If the count received is the first pulse 102 then the control counter 24 is set for decrementing and the reference value stored in display counter 28 is loaded 104 into counter 24. If the count is not the first pulse 102 and not the last pulse 106, then each input pulse strobes counter 24, 108 so that the value stored therein is initially decremented. If counter 24 encounters zero 110 then it is set for incrementing 112, otherwise counter 24 continues to count down. When the last pulse of the received pulse train is encountered 106, strobing of counter 24 ceases and the flip-flops 22 and 26 are loaded 114. If the resulting value in counter 24 is greater than or equal to 180° 116, then counter 28 is set to increment 118. If the result in counter 24 is less than 180° 116, then counter 28 is set to decrement 120.

Four possible logical combinations are represented by the three decisions 116, 122, and 124. The four different logical combinations are conveniently represented by a truth table for an EXCLUSIVE OR function, which is provided below in tabular form:

| A<br>Is Result in<br>Counter 24<br>$\geq 180$? | B<br>Is $Q_1$<br>Negative? | C<br>Set for counter 28<br>to count |
|---|---|---|
| 0 | 0 | 0 |
| 0 | 1 | 1 |
| 1 | 0 | 1 |
| 1 | 1 | 0 | where 1 = YES and 0 = NO in columns A and B
where 1 = UP and 0 = DOWN in column C In other words, the circuitry operates according to the following logical function:

$$A \; XOR \; B = C$$

where:

A is the answer to logic question 116,

B is the answer to logic questions 122 or 124, and

C is the decision represented by steps 126 or 128.

If the result of the above described logical function is affirmative, then counter 28 is set for incrementing 126. If, on the other hand, the result is negative, counter 28 is set for decrementing 128.

The oscillator 40 is thereafter enabled and counters 24 and 42 are strobed 130. If the result in counter 42 is a multiple of N 136, where N is the averaging factor, then counter 28 is strobed 138 to increment or decrement the previous value stored therein. The cycle is continued until the control counter 24 contains a value of 0 132 or 360° 134, whereupon oscillator 40 is disabled and the resultant value stored in counter 28 is provided 140 to output display apparatus 30. The resultant numerical value is a weighted average value of the input and the stored or reference value, where the preselected value of N is the averaging or weighting factor. Where the weighting factor N is equal to 1 there is no averaging; the output from counter 28 is the last read input. Where the averaging factor N is equal to 2 a true average is provided. Where N is greater than 2 a weighted average is provided.

By way of illustration of one computation cycle of the averaging function, consider the following hypothetical example where N is selected to be 2. Initially counter 28 is assumed to contain a value of 46, representing a previously computed heading of 46°, and the value provided at the input 10 is assumed to be 328 pulses representing a present compass reading of 327°. The envelope detector 14, leading edge detector 16, and trailing edge detector 18 detect the commencement and termination of the received pulse train. The first pulse of the received train causes provision of a signal from leading edge detector 16 which sets flip-flop 22 to provide a ZERO at output $Q_1$. The signal from leading edge detector 16 also strobes the contents of counter 28 into control counter 24 so that counter 24 contains the initial value of 46. The output $Q_1$ of flip-flop 22, being ZERO, sets counter 24 to decrement. The input pulse train of 327 pulses is provided through OR gate 12 to the clock terminal of counter 24, thus initially decrementing the value in counter 24.

In this example, zero detector 38 detects the value of ZERO on the 47th pulse, with the result that the input R of flip-flop 22 is set to ONE, causing the output $Q_1$ to be set to ONE and counter 24 to be reset to increment. Therefore, counter 24 contains a value of 1 upon the 48th input pulse. The control counter 24 continues to increment until the end of the input pulse train is detected. The resulting count in counter 24 is the difference between the headings of 46° to 327° which in this case is a value of 281. Since the result exceeds 180°, the 180° detector 34 provides a ONE signal to data input $D_1$ of flip-flop 22 and to an input of XOR gate 46. Since the current value stored in flip-flop 22 at output $Q_1$ is also ONE, the logical XOR function of gate 46 provides a ZERO at data input $D_2$ of flip-flop 26.

Upon detection of the trailing edge of an input pulse, the flip-flops 22 and 26 respectively are strobed, thereby setting counter 24 in this example to increment and counter 28 to decrement. The NOR gate 20 enables oscillator 40, which, after a slight time delay, begins to strobe counters 24 and 42, and counter 42 strobes counter 28 according to the preselected weighting factor N. Since the weighting factor is selected to be 2 counter 28 is strobed with every second input count to counter 42.

Counter 24 is incremented 79 counts until a value of 360 is encountered, whereupon oscillator 40 is disabled stopping the strobing of counters 24 and 42. Recalling that counter 28 is a modulo-360 ring counter and N is selected to be 2, counter 28 is decremented 39 counts from its initial value of 46 to a computed value of 7°. This computed value is read on a compass display. The iterative cycle is repeated for each new input reading to provide a continuously computed compass heading in accordance with the selected averaging characteristic.

By way of summary, it should be evident that the output of oscillator 40 corresponds to the magnitude of the difference between the input reading and the stored reading, taking into account that if the difference exceeds 180°, 360° is subtracted from such difference in order to define a direction relative to the prior computed compass heading. It is to be further noted that the output $Q_2$ of flip-flop 26 represents the direction or sense of the difference between the input and stored readings. The output heading provided by counter 28 is thus provided for display or other purposes in a manner corrected in accordance with the average value of the difference between successive compass readings. The degree of averaging provided by the novel circuitry is readily selectable to provide an averaged output heading having a selectable degree of electronic damping. The display of an averaged heading eliminates visual flicker between a sequence of digits of a numerical display such as can occur in the absence of the invention by reason of small angular movement of the compass disc, say by one or two degrees, and which gives rise to a correspondingly changing visual display. Such variable damping cannot be easily achieved in mechanically damped compasses.

In addition, signals derived from counter 42 and flip-flop 26 of the novel circuitry provide error signals denoting magnitude and direction of heading error and which are themselves usable in automatic piloting or other systems in which a representation of the difference between successive compass headings is required. In an automatic piloting system for example, counter 28 may be preset to a desired heading and the clock input disconnected such that the value of the preset heading can be compared with an input heading from a magnetic compass for providing an error signal representing the magnitude and sense of the difference between the input heading and preset heading thereby to control vessel steering and the like.

As discussed above, the invention is also useful with other than remote reading magnetic compasses to provide a signal indication of the magnitude and sense of the difference between successive angular positions. The angular positions can be provided by a variety of instruments and devices such as a wind direction indicator in which signals representative of wind direction are produced. Accordingly, the invention is not to be limited to that which has been particularly shown and described except as indicated in the appended claims.

What is claimed is:

1. A signal averaging circuit comprising:
   means for receiving digital signals representing successive angular positions and for providing signal indications thereof;
   first means operative in response to a previously received digital signal for storing a representation of an average value thereof;
   second means operative to store said representation from said first storing means and thence operative in response to a presently received digital signal to effectively subtract the value of said present digital signal from the value of said previous digital signal;
   third means operative in response to the resultant of said subtraction to provide an output signal indication of the magnitude of the difference between the values of said previous and present digital signals and an output signal indication of the direction of said difference with respect to the previous angular position; and
   fourth means operative in response to the resultant of said subtraction to provide an output indication of an averaged value of said previous and present digital signals and of the corresponding average angular position.

2. A circuit according to claim 1 wherein said receiving means includes
   means for providing signal indications of the commencement and termination of said digital signals; and
   gate means for coupling said received digital signals to said second storing means;
   and wherein said first and second storing means each include a bidirectional counter and control means for selectively providing incrementing and decrementing of said counter.

3. A circuit according to claim 2 wherein said second means includes
   oscillator means for providing clock signals to said bidirectional counter in said second storing means in response to and representative of said presently received digital signal to cause said subtraction of the values of said present and previous digital signals;
   said clock signals being of a number representing the magnitude of said difference between the values of said previous and present digital signals.

4. A circuit according to claim 3 wherein said third means includes divider means operative in response to said clock signals to apply clock signals to the bidirectional counter of said first storing means to cause provision by said fourth means of said averaged value of said previous and present digital signals,
   said clock signals from said divider means representing the magnitude of the difference between the values of said previous and present digital signals.

5. For use with a digital magnetic compass providing digital signals representative of compass heading, circuitry for computing an average compass heading comprising:
   means for receiving said digital signal and including means for providing a signal indication of the commencement and termination of said digital signals;
   divider means operative to provide an output count which is a predetermined subdivision of an input count thereto and providing an output signal indication of the magnitude of the difference between the previous and present computed headings;
   first counter means for storing and a count representative of a previous computed compass heading and operative in response to signals from said divider means to provide an output count representative of an average between the previous and present computed headings;
   second counter means operative to store the count from said first counter means and thence operative in response to said digital signals representing a present compass heading to effectively subtract the value of said present heading from the count representing said previous computed heading;

first gate means operative to selectively provide incrementing and decrementing control signals for said second counter means;

second gate means operative to selectively provide incrementing and decrementing control of said first counter means and divider means and providing an output signal indication of the direction of said difference with respect to a previous computed compass heading;

detector means operative in response to the resulting count in said second counter means representing a heading equal to or greater than 180° to provide a signal indication to said first and second gate means; and oscillator means operative upon termination of said received digital signals to provide clock signals to said divider means and to said second counter means to cause said second counter means to cycle from said resulting count to a final value and to cause corresponding cycling of said divider means.

6. Circuitry according to claim 5 wherein said first gate means includes flip-flop means having input means operative in response to the commencement of said present digital signal for directing said second counter means to decrement, means operative in response to the occurrence of zero in said second counter means for temporarily storing said zero occurrence and for directing said second counter means to increment thereby indicating the occurrence of a negative count, and data input means for receiving and storing the output of said detector means.

7. Circuitry according to claim 6 wherein said second gate means includes an EXCLUSIVE OR gate operative in response to the control signals of said first gate means and further operative in response to the output of said detector means;

said EXCLUSIVE OR gate providing a signal indication of the direction of the difference between said previous and present computed compass headings.

8. Circuitry according to claim 7 wherein said oscillator means includes a NOR gate coupled to said receiving means, said zero detection means and means of said second counter means for detection of the end of a counting cycle of said second counter means; and said oscillator coupled to said NOR gate and enabled thereby for a count interval representative of the magnitude of the difference between said previous and present compass headings.

9. Circuitry according to claim 5 wherein said second counter means includes cycle termination means comprising first and second detectors respectively operative to determine the occurrence of a count representative of zero when said second counter means is decrementing and a count representative of 360° when said second counter means is incrementing;

said zero count determining means being operative to cause said first gate means to provide an incrementing control signal to said first counter means;

said 360° count determining means being operative to disable said oscillator means and said first counter means upon detection of a count representing 360° in said first counter means.

10. Circuitry according to claim 9 wherein said detector means is operative to provide first and second signal indications upon detection of a resultant count in said second counter means representing a heading less than 180° and a heading equal to or greater than 180° respectively;

said first signal indication being applied to said first gate means and second gate means to provide decrementing control signals for said first counter means;

said second signal indication being applied to said first gate means and second gate means to provide incrementing control signals for said first counter means.

11. Circuitry according to claim 10 wherein said second gate means provides an EXCLUSIVE OR function according to the following truth table

| A | B | C |
|---|---|---|
| 0 | 0 | 0 |
| 0 | 1 | 1 |
| 1 | 0 | 1 |
| 1 | 1 | 0 | where A is the resulting count in said second counter means, 0 being a count less than 180°, 1 being a count equal to or greater than 180°;

where B represents the control signals of said first gate means, 0 being a decrementing control, 1 being an incrementing control; and where C represents the direction of counting of said first counter means, 0 being a decrementing count, 1 being an incrementing count.

* * * * *